United States Patent [19]

Haines et al.

[11] Patent Number: 4,823,189

[45] Date of Patent: Apr. 18, 1989

[54] METHOD AND APPARATUS FOR CREATING A DITHER PATTERN

[75] Inventors: Douglas I. Haines, Mulino; Patrick E. Welborn, Tualatin, both of Oreg.

[73] Assignee: Tektronix, Inc., Beaverton, Oreg.

[21] Appl. No.: 47,815

[22] Filed: May 8, 1987

[51] Int. Cl.$^4$ ............................................. H04N 1/46
[52] U.S. Cl. ..................................... 358/75; 358/78; 358/283; 358/298
[58] Field of Search ................. 358/75, 75 IJ, 78, 283, 358/298

[56] References Cited

U.S. PATENT DOCUMENTS

| | | | |
|---|---|---|---|
| 4,032,978 | 6/1977 | Wong | 358/298 X |
| 4,258,393 | 3/1981 | Ejiri et al. | 358/283 |
| 4,491,875 | 1/1985 | Kawamura | 358/283 X |
| 4,495,522 | 1/1985 | Matsunawa et al. | 358/283 X |
| 4,517,605 | 5/1985 | Yokomizo | 358/283 X |
| 4,531,160 | 7/1985 | Ehn | 358/298 X |
| 4,553,173 | 11/1985 | Kawamura | 358/298 |
| 4,680,625 | 7/1987 | Shoji et al. | 358/75 X |
| 4,736,254 | 4/1988 | Kotera et al. | 358/298 X |

Primary Examiner—James J. Groody
Assistant Examiner—E. Anne Faris
Attorney, Agent, or Firm—John Smith-Hill; Robert S. Hulse

[57] ABSTRACT

A record in which a color is represented on a record medium at a selected gray scale level is created by resolving an addressable area of the record medium into a square array of addressable record locations and organizing the record locations into a plurality of groups each containing a 4×4 array of record locations. The groups are organized into a plurality of dither cells each containing a 4×4 array of groups, whereby each dither cell contains 256 addressable record locations. An $[i+(j \times 16)]$th gray scale level is established within a selected area of the record medium, where i is an integer in the range from zero to 16, j is an integer in the range from zero to 16 and $[i+(j \times 16)]$ is an integer in the range from zero to 255, by addressing j record locations in each group of each dither cell within the selected area and addressing one additional record location in each of the i groups of each dither cell within the selected area, the j addressed locations in each group being substantially contiguous and being in substantially the same positions in their group as the j addressed locations in each other group, and the i groups which contain an additional addressed record locations being distributed substantially uniformly over the dither cell.

8 Claims, 2 Drawing Sheets

| 1 | 17 | 65 | 145 | 12 | 28 | 76 | 156 | 2 | 18 |
|---|---|---|---|---|---|---|---|---|---|
| 33 | 49 | 97 | 177 | 44 | 60 | 108 | 188 | 34 | 50 |
| 81 | 113 | 129 | 209 | 92 | 124 | 140 | 220 | 82 | 114 |
| 161 | 193 | 225 | 241 | 172 | 204 | 236 | 252 | 162 | 194 |
| 6 | 22 | 70 | 150 | 11 | 27 | 75 | 155 | 5 | 21 |
| 38 | 54 | 102 | 182 | 44 | 59 | 107 | 187 | 37 | 53 |
| 86 | 118 | 134 | 214 | 91 | 123 | 139 | 219 | 85 | 117 |
| 165 | 198 | 230 | 246 | 171 | 203 | 235 | 251 | 165 | 197 |
| 13 | 29 | 77 | 157 | 0 | 16 | 64 | 144 | 14 | 30 |

| 1 | 17 | 65 | 145 | 12 | 28 | 76 | 156 | 2 | 18 |
|---|---|---|---|---|---|---|---|---|---|
| 33 | 49 | 97 | 177 | 44 | 60 | 108 | 188 | 34 | 50 |
| 81 | 113 | 129 | 209 | 92 | 124 | 140 | 220 | 82 | 114 |
| 161 | 193 | 225 | 241 | 172 | 204 | 236 | 252 | 162 | 194 |
| 6 | 22 | 70 | 150 | 11 | 27 | 75 | 155 | 5 | 21 |
| 38 | 54 | 102 | 182 | 44 | 59 | 107 | 187 | 37 | 53 |
| 86 | 118 | 134 | 214 | 91 | 123 | 139 | 219 | 85 | 117 |
| 165 | 198 | 230 | 246 | 171 | 203 | 235 | 251 | 165 | 197 |
| 13 | 29 | 77 | 157 | 0 | 16 | 64 | 144 | 14 | 30 |

FIG. 2

METHOD AND APPARATUS FOR CREATING A DITHER PATTERN

This invention relates to a method and apparatus for creating a dither pattern.

BACKGROUND OF THE INVENTION

A color graphics printer generally includes a printer frame buffer in which information representing the desired distribution of color over a printable area of a record medium, such as a sheet of paper, is stored in CMY format. It is known to use a binary printer, e.g. an ink jet printer or a thermal wax transfer printer, for color graphics printing. A binary printer applies discrete dots of color media to the record mediun and addresses the record medium in accordance with a square array of discrete record location, rather than over a continuum of locations. The dots are all of the same size, and variation in the darkness with which a color medium is applied to the record medium is accomplished by varying the number of dots applied over a unit area of the record medium. The addressable memory locations in the printer frame buffer are associated on a one-to-one basis with the addressable record locations of the record medium, and each addressable memory location is capable of storing three digital words each comprising, for example, eight binary digits, or bits. Each set of three digital words represents the contributions of the three primary color components (cyan, magenta and yellow) to the desired color of the associated record location of the record medium. (An additional word may be associated with the color black.)

When a printable record medium is addressed, the printer scans successive rows of record locations in the square array. The contents of the printer frame buffer are read synchronously with scanning of the record medium by the printer. The record locations of the record medium are organized into contiguous dither cells, each of which might have sixteen record locations on a side, and thus contain 256 record locations. A unique gray scale reference value, which may be expressed as an integer in the range from 0 to 255, is associated with each record location within the dither cell. The three (or four) digital words associated with a particular record location are compared with the reference value for that location, and if one of the digital words represents a value that is at least as great as the reference value, the printer applies a dot of the appropriate color to the record medium. All the dots are nominally of the same size, but in practice the dots are usually larger than their nominal size. For example, in the case of an ink jet printer, the ink tends to bleed over the record medium, and in the case of a thermal wax transfer printer the dots tend to smear.

Record locations having successive reference values are not grouped together in a dither cell but are distributed over the cell in accordance with a predetermined dither pattern. The dither pattern may be based on a magic square. A magic square is a square array of $P \times P$ terms in an arithmetic progression such that the sum of the terms in each column, each row and each major diagonal is the same. In a magic square, containing $P \times P$ integers from O to $P \times P - 1$, successive numbers are distributed in a substantially random fashion over the square. A magic square can be defined for $P=4$.

In a color graphics printer that is at present commercially available, the 256 record locations in a $16 \times 16$ dither cell are organized as a $4 \times 4$ magic square of groups, each of which contains a $4 \times 4$ magic square of record locations. In this case, the sixteen groups contain the numbers from 0 to 15 respectively as their smallest reference values, and the sixteen groups are arranged in a magic square in accordance with their smallest reference values, as shown in Table I. The fifteen additional numbers in each group are in an arithmetic progression having a common difference of 16, and the sixteen numbers in each group are arranged in a magic square, as shown in Table II for the group containing the number 0.

TABLE I

| 1 | 12 | 2 | 15 |
| 6 | 11 | 5 | 8 |
| 13 | 0 | 14 | 3 |
| 10 | 7 | 9 | 4 |

TABLE II

| 16 | 192 | 32 | 240 |
| 96 | 176 | 80 | 128 |
| 208 | 0 | 224 | 48 |
| 160 | 112 | 144 | 64 |

With the type of dither pattern described with reference to Tables I and II, successive reference values in a group of record locations are distributed over the group in a substantially random fashion. If a printable record medium is printed using a dither pattern of this type, for gray scale levels below about 128 (in the range from 0 to 256), the enlarging of each dot due to bleeding or smearing has the effect of increasing significantly the darkness of the image created on the record medium beyond the value indicated by the contents of the frame buffer.

SUMMARY OF THE INVENTION

A preferred embodiment of the present invention is a method of creating a record in which a color is represented on a record medium at a selected gray scale level. An addressable area of the record medium is resolved into a square array of addressable record locations and the record locations are organized into a plurality of groups each containing a square array of $m \times m$ record locations, where m is a positive integer. The groups are organized into a plurality of dither cells each containing a square array of $M \times M$ groups, where M is a positive integer, whereby each dither cell contains $M \times M \times m \times m$ addressable record locations. An $[i+(j \times M \times M)]$th gray scale level is established within a selected area of the record medium, where i is an integer in the range from zero to $M \times M$, j is an integer in the range from zero to $m \times m$ and $[i+(j \times M \times M)]$ is an integer in the range from zero to $M \times M \times m \times m$, by addressing j record locations in each group of each dither cell within the selected area and addressing one additional record location in each of the i groups of each dither cell within the selected area, the j addressed locations in each group being substantially contiguous and being in substantially the same positions in their group as the j addressed locations in each other group, and the i groups which contain an additional addressed record locations being distributed substantially uniformly over the dither cell.

The j addressed locations in each group form a cluster of record locations, and accordingly when a color dot is larger than its nominal size, much of the amount by which the area of the printed dot exceeds the nominal size is taken up in overlapping adjacent dots of the same color and not in providing the color on an area of the record medium that would not normally receive that color.

BRIEF DESCRIPTION OF THE DRAWINGS

For a better understanding of the invention, and to show how the same may be carried into effect, reference will now be made, by way of example, to the accompanying drawing, in which FIG. 1 is a block diagram of part of a color graphics printer and FIG. 2 illustrates reference values for part of a 16×16 dither cell.

DETAILED DESCRIPTION

Figure 1:
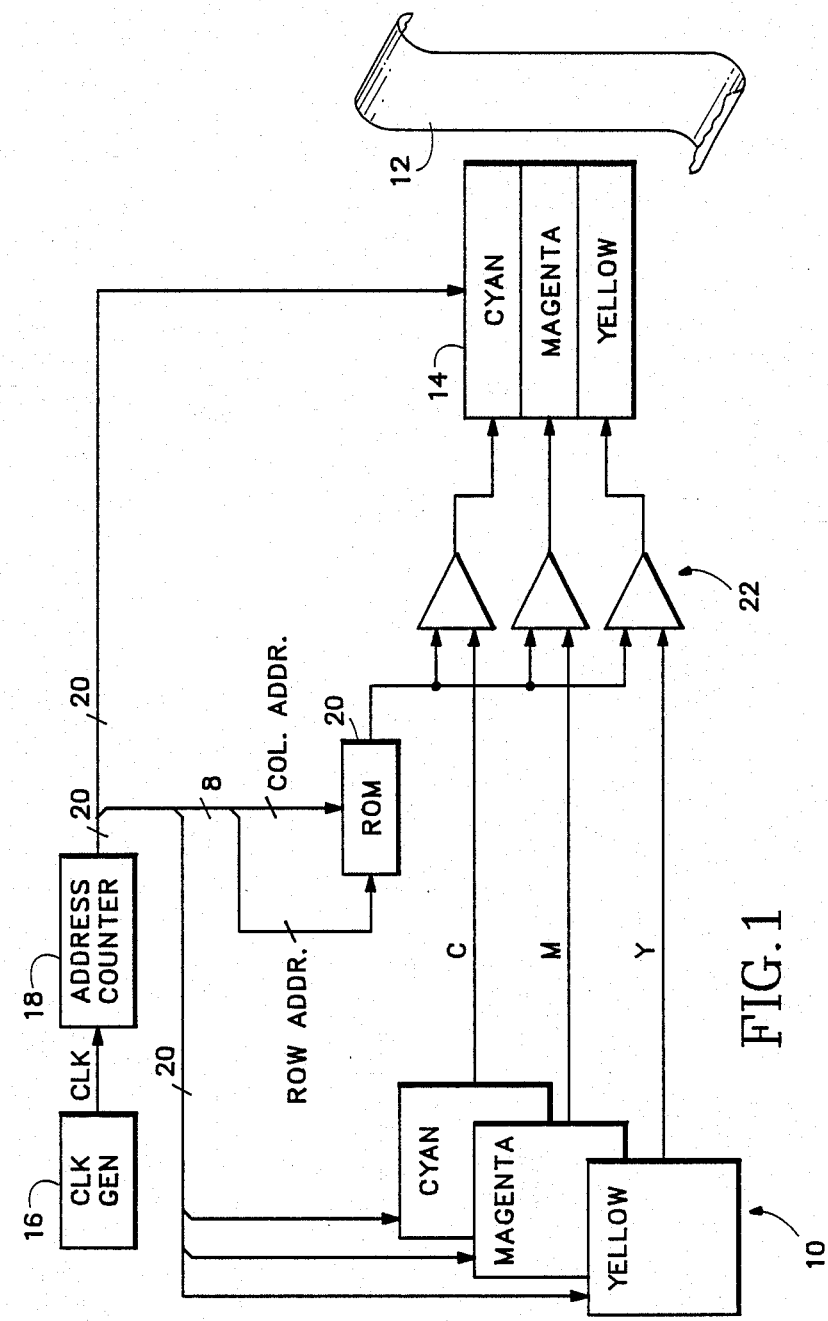

Referring to FIG. 1, a printer frame buffer 10 contains three arrays of data words representing respectively the darkness with which three primary colors, e.g. cyan, magenta and yellow, should be applied to the printable area of a record medium 12 by means of a printhead 14. A clock generator 16 generates a clock signal CLK which is applied to a counter 18 for generating address words. If, for example, the printhead 14 is able to address 1024 discrete horizontal locations of the printable area and 1024 discrete vertical locations, the counter 18 provides a 20-bit address signal of which the ten lower bits represent a column address and the ten upper bits represent a row address. The 20-bit address signal is applied to the printhead for controlling horizontal and vertical scanning of the record medium by the printhead. The address signal is also applied to the frame buffer for reading color component signals C, M, Y from the frame buffer. The lower four bits of the row address word and the lower four bits of the column address word are applied as row and column address signals to a read-only memory 20. The read-only memory contains a matrix of 256 eight-bit words from 0 to 255 representing the reference values that are used in establishing a 16×16 dither cell. The 16×16 dither cell is made up of sixteen groups, each of which contains a 4×4 array of reference values. The sixteen groups contain the numbers 0 to 15 respectively and are arranged in the magic square shown in Table I. The sixteen numbers in each group are arranged to form a cluster that grows from the upper left-hand corner of that group, as shown in Table III for the group containing the number 0.

TABLE III

| 0 | 16 | 64 | 144 |
|---|----|----|-----|
| 32 | 48 | 96 | 176 |
| 80 | 112 | 128 | 208 |
| 160 | 192 | 224 | 240 |

FIG. 2 illustrates part of the dither cell based on Tables I and III. The different groups containing the 4×4 arrays of reference values are indicated in FIG. 2 by heavy lines.

The three color component words C, M, Y for each record location of the record medium 12 are each compared with the reference value for that location using comparators 22. If the numerical value of the word for a given color component and a given location is less than or equal to the reference value, the comparator provides a logical 0 output and the printhead 14 does not apply a dot of the given color to the given location of the record medium, whereas if the numerical value is greater than the reference value the comparator provides a logical 1 output and the printhead applies a dot of the given color to the given location.

It will be seen from Tables I and III that the distribution of gray scale levels from group to group in ascending order is substantially random in character, in that the consecutive numbers are not grouped together. On the other hand, the ascending order within a group is in a cluster that grows from the top left-hand corner of the group. Therefore, as the darkness of a color represented by a particular combination of hue and saturation increases, the groups within the dither cell are addressed in a substantially random fashion but the locations within a given group are addressed in an orderly fashion, so that for any darkness level, the printed area within the group is composed only of contiguous printed dots. In this manner, the effect of bleeding or smearing of printed dots is reduced as compared with the dither pattern described previously.

It will be appreciated that the present invention is not restricted to the particular embodiment that has been described, and that variations may be made therein without departing from the scope of the invention as defined in the appended claims and equivalents thereof. For example, the groups within the dither cell need not be arrayed in a magic square, and the element that is associated with the lowest reference value in a given cell need not be at any specific location within that cell. It is preferred that the groups and the dither cell each be square, and that the number of locations on each side be an integral power of two, but this is not essential. It is not essential that the reference values be precisely in an arithmetic progression, e.g. from 0 to 255, since in some applications it may be desirable to associate the same reference value with two record locations.

It will be appreciated that the pth term in a first arithmetic progression can be converted unambiguously to the pth term in a second arithmetic progression if the first term and the common difference of each progression are known. Accordingly, where this specification defines the terms of an arithmetic progression, the defiition is intended to cover corresponding values that are defined by reference to another arithmetic progression.

Although the foregoing detailed description is expressed in terms of an implementation of the invention in hardware, it will be appreciated that many functions may be implemented in software instead.

We claim:

1. A method of creating a record in which a given color is rendered with a selected gray scale level, comprising:
    resolving an addressable area of a record medium into a multiplicity of addressable record locations, the record locations being in a rectangular array of rows and columns,
    organizing the addressable record locations into a plurality of groups each containing a rectangular array of m×n addressable record locations, where m and n are each greater than two, and each group having four locations in respective corners of the m×n array,
    organizing the groups into a plurality of dither cells each containing a rectangular array of M×N groups, whereby each dither cell contains M×N×m×n addressable record locations,
    applying the given color to j record locations in each group of at least one dither cell, where j is an integer in the range from zero to m×n−1, and in the event that j is greater than one, each of the j record locations in a group being in the same row or column as at least one other of the j record locations of that group, and in the event that j is less than ten, all j addressed record locations of that group being within a 3×3 array, with the record location at one corner of the 3×3 array being at one of the corners of the m×n array, and applying the given color to one additional record location in each of i groups of said one dither cell, where i is an integer in the range from zero to M×N−1, in the event that j is greater than zero, the additional record location in each of the i groups being in the same row or column as at least one of the j record locations of that group, in the event that j is less than nine, the additional record location in each of the i groups being within said 3×3 array and in the event that i is greater than one, the i groups being distributed substantially uniformly over the dither cell.

2. A method according to claim 1 wherein m is equal to n and M is equal to N.

3. A method according to claim 2, wherein m and M are each equal to an integral power of two.

4. A method according to claim 3, wherein m, n, M and N are each equal to 4.

5. A method of creating a record from a sequence of R×S numerical values each in the range from 0 to M×N×m×n, where R, S, M, N, m, and n are positive integers and R and S are each much greater than M, N, m and n, comprising:

resolving an addressable area of a record medium into a rectangular array of R×S addressable record locations, whereby the numerical values are associated with respective record locations, the record locations being in a rectangular array of rows and columns, organizing the R×S addressable record locations into a plurality of groups each containing a rectangular array of m×n addressable record locations, where m and n are each greater than two, and each group having four locations in respective corners of the m×n array, organizing the groups into a plurality of dither cells each containing a rectangular array of M×N groups, whereby each dither cell contains M×N×m×n addressable record locations, associating a reference value with each addressable location in each dither cell, the reference values being terms in a first progression which is substantially an arithmetic progression from zero to M×N×m×n and having a common difference of unity, the reference values associated with the record locations in each group being terms in a second progression which is substantially an arithmetic progression freom Q to [Q+(m×n×D)] Q+(m×n×(D−1)), where Q is the smallest of the reference values for the record locations in that group and D is equal to M×N, and the locations with which the second and each subsequent terms in the second progression are associated being in the same row or column as a location with which a preceding term in the second progression is associated, and the locations with which the first nine terms in the second progression are associated all being within a 3×3 array, with the record locations at one corner of the 3×3 array being at one of the corners of the m×n array, and the smallest of the reference values in the groups respectively being terms in a third progression which is substantially an arithmetic progression from zero to (M×N)−1 and the groups containing successive terms in the third progression being distributed substntially uniformly over the dither cell, and comparing the numerical value for a record location with the reference value for that location and, in the event that the numerical value and the reference value are in a predetermined relationship, applying color the record location and otherwise not applying color to that location.

6. Apparatus for creating a record in which a given color is rendered with a selected gray scale level, comprising:

means for resolving an addressable area of a record medium into a rectangular array of addressable locations, the addressable locations being in a rectangular array of rows and columns, means for organizing the addressable locations into a plurality of groups each containing a rectangular array of m×n addressable locations, where m and n are each greater than two, each group having four locations in respective corners of the m×n array, and for organizing the groups into a plurality of dither cells each containing a rectangular array of M×N groups, where M and N are positive integers, whereby each dither cell contains M×N×m×n addressable locations, means for establishing an (i+(j×M×N))th gray scale level within a selected area of the record medium, where i is an integer in the range from zero to M×N, j is an integer in the range from zero to (m×n)−1, and (i+(j×M×N)) is an integer in the range from zero to M×N×m×n, by applying the given color to j addressable record locations in each group of each dither cell within the selected area and to one additional addressable record location in each of i groups of each dither cell within the selected area, the i groups being distributed substantially uniformly over the dither cell, said one additional location in each of the i groups being in the same row or column as one of the j locations of that group, and in the event that (j+i) is less than ten, all the (j+i) addressed locations of that goup being within a 3×3 array, with the record location at one corner of the 3×3 array being at one of the corners of the m×n array.

7. Apparatus according to claim 6, whrerein m and n are each equal to four.

8. A method according to claim 5, wherein M is equal to N and the groups containing successive terms in the third progression are distributed over the dither cell in a manner such that the successive terms of the third progression are in a magic square.

* * * * *